(12) United States Patent
Kim et al.

(10) Patent No.: US 8,514,363 B2
(45) Date of Patent: Aug. 20, 2013

(54) LIQUID CRYSTAL DISPLAY PANEL

(75) Inventors: Nam-Jin Kim, Yongin (KR);
Seon-Hong Ahn, Yongin (KR)

(73) Assignee: Samsung Display Co., Ltd. (KR)

( * ) Notice: Subject to any disclaimer, the term of this patent is extended or adjusted under 35 U.S.C. 154(b) by 169 days.

(21) Appl. No.: 12/973,176

(22) Filed: Dec. 20, 2010

(65) Prior Publication Data

US 2011/0234965 A1    Sep. 29, 2011

(30) Foreign Application Priority Data

Mar. 23, 2010    (KR) .......................... 10-2010-0025970

(51) Int. Cl.
*G02F 1/1339*    (2006.01)
(52) U.S. Cl.
USPC .......................................... 349/153; 349/190
(58) Field of Classification Search
None
See application file for complete search history.

(56) References Cited

U.S. PATENT DOCUMENTS

| 6,396,470 | B1 * | 5/2002 | Zhang et al. | 345/87 |
| 2004/0141128 | A1 * | 7/2004 | Kim et al. | 349/138 |
| 2006/0139553 | A1 * | 6/2006 | Kang et al. | 349/149 |
| 2006/0139556 | A1 * | 6/2006 | Ahn et al. | 349/153 |
| 2008/0158493 | A1 * | 7/2008 | Park | 349/139 |

FOREIGN PATENT DOCUMENTS

| KR | 10-2003-0088645 | | 11/2003 |
| KR | 10-2006-0072318 | A | 6/2006 |
| KR | 10-2009-0090493 | | 8/2009 |

* cited by examiner

*Primary Examiner* — Thanh-Nhan P Nguyen
(74) *Attorney, Agent, or Firm* — Knobbe Martens Olson & Bear, LLP

(57) ABSTRACT

A liquid crystal display panel that can maintain sufficient adhesiveness between substrates. A liquid crystal display panel includes a first substrate, a second substrate facing the first substrate, circuit lines disposed in the first substrate, the circuit lines including a color filter common voltage line, and a sealing member interposed between the first substrate and the second substrate. The circuit lines are disposed in a first area including the color filter common voltage line and a second area that does not include the color filter common voltage line, and the sealing member is disposed closer to the edge of the first substrate than to the second area of the circuit lines.

18 Claims, 4 Drawing Sheets

LIQUID CRYSTAL DISPLAY PANEL

CROSS-REFERENCE TO RELATED APPLICATIONS

This application claims priority to and the benefit of Korean Patent Application No. 10-2010-0025970 filed in the Korean Intellectual Property Office on Mar. 23, 2010, the entire contents of which are incorporated herein by reference.

BACKGROUND

1. Field

The described technology relates generally to a liquid crystal display panel. More particularly, the described technology relates generally to a liquid crystal display panel having adjusted circuit lines arranged in a non-display area of the liquid crystal display panel.

2. Description of the Related Art

A liquid crystal display (LCD) has advantages, such as decreased size, thickness, and power consumption, so that it can be mounted in and used for small-sized products such as mobile phones, personal digital assistants (PDAs), portable multimedia players (PMPs), and other similar mobile and small sized devices. The LCD can be used in medium-sized and large-sized products such as monitors and TVs, and other similar electronic devices.

The LCD has a liquid crystal display panel displaying image data using an optical characteristic of liquid crystal, a flexible printed circuit (FPC) having a driving circuit driving the liquid display panel, a backlight assembly including a light source, and a mold frame receiving the backlight assembly. The liquid crystal display panel includes a thin film transistor (TFT) substrate, a color filter (CF) substrate, and liquid crystal interposed therebetween. The liquid crystal display is formed by sealing the thin film transistor substrate and the color filter substrate using a sealant, hardening the sealant, and cutting the sealed substrates into cell units.

The liquid crystal display panel includes a display area displaying an image, and a non-display area. In general, a thin film transistor is formed in the display area of the thin film transistor substrate, and circuit lines such as a gate driver are formed to drive a gate of the thin film transistor in the non-display area. The sealant sealing the substrates is hardened by exposing ultraviolet light to a side of the thin film transistor substrate coated with the sealant from a side opposite the coated side. In this case, the sealant is coated in the non-display area on the thin film transistor substrate or color filter substrate, and accordingly it may overlap the circuit lines when being coated. As described, when the circuit lines are overlapped with the sealant, the UV light that hardens the sealant may be partially blocked by the circuit lines. Thus, the sealant may not be sufficiently hardened. Accordingly adhesiveness between the substrates may be weakened.

The above information disclosed in this Background section is only for enhancement of understanding of the background of the described technology and therefore it may contain information that does not form the prior art that is already known in this country to a person of ordinary skill in the art.

SUMMARY

Aspects of the present invention provide a liquid crystal display panel that can maintain strong adhesiveness between substrates through hardening a sealant.

Aspects of the present invention provide a liquid crystal display panel including a first substrate, a second substrate facing the first substrate, circuit lines disposed on the first substrate, the circuit lines including a color filter common voltage line, and a sealing member interposed between the first substrate and the second substrate. The circuit lines are disposed in a first area including the color filter common voltage line and a second area that does not include the color filter common voltage line, and the sealing member is arranged closer to an edge of the first substrate than to the second area having the circuit lines.

According to another aspect of the present invention, the circuit lines may further include a gate driver or an amorphous silicon gate. In addition, the circuit lines may further include a thin film transistor common voltage (Vcom) line.

According to another aspect of the present invention, the circuit lines may be mounted in the first substrate.

According to another aspect of the present invention, a common electrode may be formed on the second substrate.

According to another aspect of the present invention, the sealing members may be formed at a distance from each other at the edge of the first substrate and an edge of the second substrate, or may be formed along the edge of the first substrate and the second substrate.

According to another aspect of the present invention, the liquid crystal display panel may further include a dam formed along the edge of the first substrate and the second substrate. In this case, the common electrode may be formed at an inner side of the liquid crystal display panel by taking the dam as a boundary.

According to another aspect of the present invention, the sealing member may be disposed to be closer to the edge of the first substrate than to the first area of the circuit lines.

According to another aspect of the present invention, an area where the sealing member is formed may overlap the first area of the circuit lines.

According to another aspect of the present invention, the sealing member may include a spacer, and the spacer may connect the color filter common voltage line and the common electrode. In this case, the spacer may be formed with a conductive material, or may be formed by coating a metal on a non-conductive material.

Aspects of the present invention provide a liquid crystal display panel including a first substrate having a pixel area, a transistor driving the pixel area, a storage capacitor, and a pixel electrode, a second substrate facing the first substrate and having a common electrode disposed on the second substrate, circuit lines disposed in the first substrate and including a color filter common voltage line, and a conductive spacer electrically connecting the color filter common voltage line and the common electrode. In this case, the color filter common voltage line is disposed at the outermost part of an area where the circuit lines are formed.

According to another aspect of the present invention, the circuit lines may further include a test pad line disposed farthest from the color filter common voltage line so as to be closest to the pixel area.

According to another aspect of the present invention, the circuit lines may further include a thin film transistor common voltage line disposed closest to the test pad line in a direction toward the color filter common voltage line from the test pad line.

According to another aspect of the present invention, the circuit lines may further include a buffer line and a gate driver disposed between the thin film transistor common voltage line and the color filter common voltage line.

According to another aspect of the present invention, the liquid crystal display panel may further include a sealing member disposed between the first substrate and the outer boundary of the second substrate and sealing the first substrate and second substrate, and only the color filter common voltage line among the circuit lines may be insulated by the sealing member. In this case, the conductive spacer may be disposed inside the sealing member.

According to aspects of the present invention, a UV blocking rate can be decreased by arranging circuit lines on the thin film transistor substrate by compressing the same to thereby sufficiently harden the sealant. In addition, through the sufficient hardening of the sealant, the adhesiveness between the substrates can be strongly maintained and the strength thereof can be maintained.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
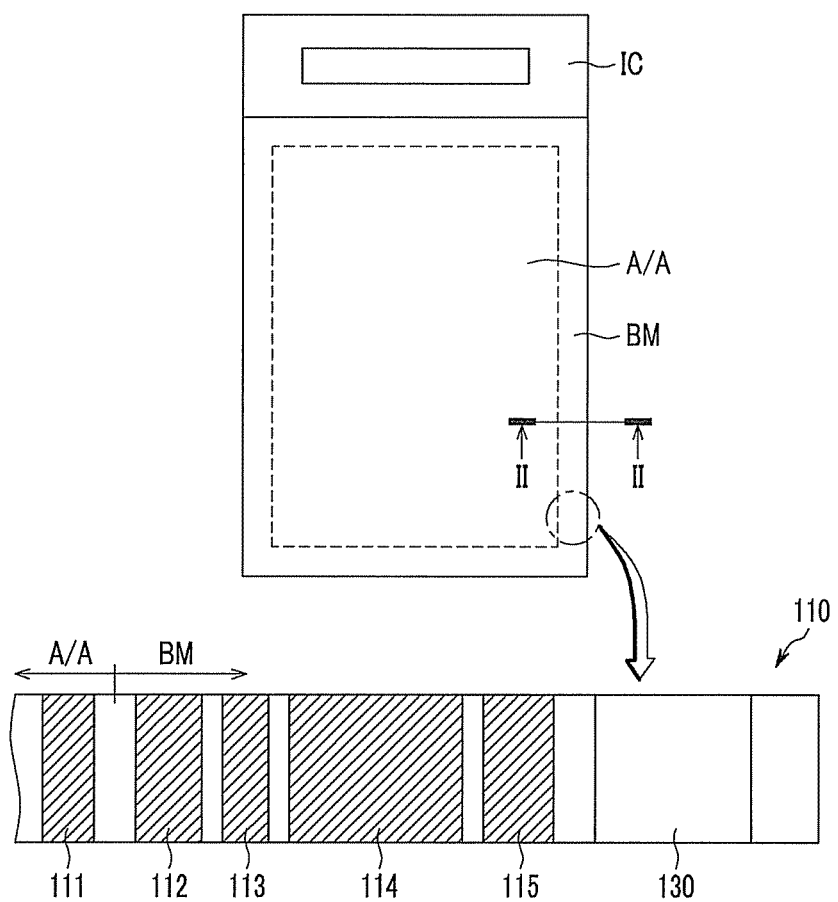
FIG. 1 is a top plan view and a partially enlarged view of a liquid crystal display panel 100 according to a first exemplary embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It is to be understood that where is stated herein that one element, film or layer is "formed on" or "disposed on" a second element, layer or film, the first element, layer or film may be formed or disposed directly on the second element, layer or film or there may be intervening element, layers or films between the first element, layer or film and the second element, layer or film. Further, as used herein, the term "formed on" is used with the same meaning as "located on" or "disposed on" and is not meant to be limiting regarding any particular fabrication process.

Figure 2:
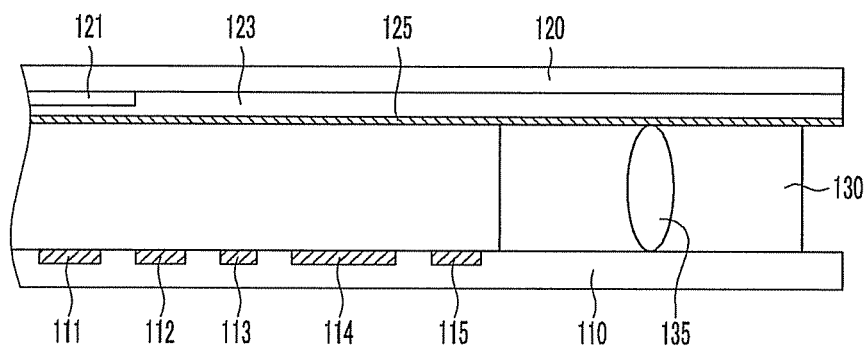
FIG. 2 is a cross-sectional view of FIG. 1.

FIG. 1 is a top plan view and a partially enlarged view of a liquid crystal display panel 100 according to a first exemplary embodiment, and FIG. 2 is a cross-sectional view of FIG. 1, taken along the line II-II. The liquid crystal display panel 100 according to the first exemplary embodiment will be described with reference to FIGS. 1 and 2.

The liquid crystal display panel 100 is divided into an active area A/A, a black matrix BM, and a driving circuit area IC. The active area A/A is a display area including a thin film transistor (TFT) (not shown) and a color filter (CF) (not shown) that display an image. The black matrix BM is a non-display area formed along an outermost side of the active area A/A and includes circuit lines arranged for displaying an image. The driving circuit area IC is a portion of the liquid crystal display panel 100 connected to an external integrated circuit driving the liquid crystal display panel 100 or a portion of the liquid crystal display panel 100 having the integrated circuit.

The partially enlarged view of FIG. 1 is an enlarged view of a first substrate 110 of the black matrix BM of the liquid crystal display panel 100. In the present exemplary embodiment, the first substrate 110 is formed with a TFT substrate and a second substrate 120 (see FIG. 2) is formed with a CF substrate. Although not shown, a thin film transistor, a storage capacitor, and a pixel electrode are formed in the active area A/A of the first substrate 110. A test pad line 111 is formed adjacent to the black matrix BM. The thin film transistor is formed by patterning a gate electrode, an insulating layer, a semiconductor layer, a drain electrode, a source electrode, a protective layer, and a pixel electrode display an image, and the storage capacitor is formed to maintain a voltage signal at each pixel. In addition, the pixel electrode is formed at each pixel to drive liquid crystal, and the test pad line 111 is formed to test the liquid crystal display panel 100 before forming an integrated circuit for driving the liquid crystal display panel 100. A thin film transistor common voltage (Vcom) line 112, a buffer line 113, a gate driver 114, and a color filter common voltage (Vcom) line 115 are sequentially formed along a direction toward the edge of the first substrate 110 in the black matrix BM of the first substrate 110.

The thin film transistor Vcom line 112 and the color filter Vcom line 115 provide a reference voltage that determines a polarity in driving of the liquid crystal. In further detail, the thin film transistor Vcom line 112 is connected to the storage capacitor formed in the first substrate 110. The color filter Vcom line 115 applies a voltage to a common electrode 125 formed on the second substrate 120 through a short spacer (not shown). The short spacer is located at each corner of the liquid crystal display panel 100. The gate driver 114 drives a gate terminal of a switching transistor of the active area A/A, and may include a shift register and a lever shifter. In further detail, the shift register of the gate driver 114 sequentially outputs a scan pulse applied to a gate terminal, and the level shifter converts a level of a signal provided from the shift register to set a turn-on voltage and a turn-off voltage of the thin film transistor. In addition, the buffer line 113 receives the output signal of the level shifter, buffers the output signal, and outputs the buffered signal to the gate line.

In the present embodiment, the color filter Vcom line 115 is connected with the common electrode 125 formed on the second substrate 120 through the short spacer. The short spacer is a conductive ball and may be short-circuited with other circuit lines if the location of the short spacer is not precisely adjusted when the color filter Vcom line 115 is located in a middle of the circuit lines. Therefore, the color filter Vcom line 115 is disposed as an outermost circuit line among the circuit lines in the present exemplary embodiment in order to prevent the above problem.

In addition, the test pad line 111 is located close to the pixel area to easily test the pixel area. The thin film transistor Vcom line 112 is disposed at a location first adjacent to an external boundary of the test pad line 111. A common voltage applied to the thin film transistor Vcom line 112 and a common voltage applied to the color filter Vcom line 115 are different from each other so that the liquid crystal display device cannot be driven when a short-circuit occurs. Therefore, other circuit lines are disposed between the thin film transistor common line 112 and the color filter Vcom line 115 to separate the two lines by a maximum distance to thereby prevent an electrical short-circuit between the thin film transistor Vcom line 112 and the color filter Vcom line 115.

Referring to FIG. 2, the test pad line 111 is mounted on the active area A/A of the first substrate 110. The thin film transistor Vcom line 112, the buffer line 113, the gate driver 114, and the color filter Vcom line 115 are mounted on the black matrix BM. However, aspects of the present invention are not limited thereto, and the circuit lines may be formed on the first substrate 110. In addition, a color filter 121, including a red filter R, a green filter G, and a blue filter B, is formed in the active area A/A of the second substrate 120. An overcoat 123 is formed to cover the color filter 121 over an entire area of the active area A/A and the black matrix BM. The common electrode 125 is formed on the overcoat 123, and the common electrode 125 is connected with the color filter Vcom line 115 of the first substrate 110 through a short spacer at each corner of the liquid crystal display panel 100 to thereby apply a voltage to the second substrate 120.

Example of an alignment of the circuit lines and other constituent elements is described below. For example, the present exemplary embodiment is applied to a low temperature polysilicon (LTPS) substrate, however, aspects of the present invention are not limited thereto, and the present exemplary embodiment may be applied to an amorphous silicon substrate. In the case of an amorphous silicon substrate, an amorphous silicon gas is used instead of a gate driver. Also, the structure, arrangement order, and location of the circuit lines is not limited to the present exemplary embodiment and can be variously modified.

In the present exemplary embodiment, the first substrate 110 and the second substrate 120 are sealed by a sealing member 130. In further detail, the first substrate 110 and the second substrate 120 are sealed by coating a sealant, including an adhesive component, to the black matrix BM on the second substrate 120. Also, the first and second substrates 110 and 120 are sealed together, and the sealant is hardened. In order to prevent the sealant from flowing to the active area A/A during the sealing process, the sealant is coated on the black matrix BM while having a predetermined distance from the active area A/A. In addition, the sealing member 130 may be formed by including a spacer 135 in the sealant and hardening the same. When the spacer 135 is included in the sealing member 130, a gap between the first and second substrates 110 and 120 can be constantly maintained by the spacer 135.

With reference to FIG. 2, the sealant is hardened by exposing ultraviolet (UV) light to a lower portion of the first substrate 110. In the present exemplary embodiment, when the circuit lines formed in the first substrate 110 overlap the sealant, the UV light is partially blocked by the circuit lines so that the sealant may not be sufficiently hardened. When the sealant is not sufficiently hardened, the first and second substrates 110 and 120 cannot maintain sufficient adhesiveness therebetween.

However, in the present exemplary embodiment, the circuit lines in the first substrate 110, that is, the thin film transistor Vcom line 112, the buffer line 113, the gate driver 114, and the color filter Vcom line 115, are compressed to one side of the black matrix BM and adjacent to the active area A/A. The sealant is coated on the outermost side of the black matrix BM, such that the sealing member 130 is formed. Accordingly, the circuit lines and the sealant are not overlapped with each other so that the UV light is not blocked by the circuit lines during the hardening process of the sealant.

For example, circuit lines between the thin film transistor Vcom line 112 and the color filter Vcom line 115 are arranged by compression such that the entire width of all the circuit lines can be set to 0.6 mm to 0.7 mm. When the circuit lines are applied to a middle-sized panel, of which a black matrix BM has a width of 1.7 mm, a portion of the middle-sized panel where the circuit lines are not formed has a width of approximately 1.0 mm along the edge of the first substrate 110. The sealing member 130, having sufficient adhesiveness, can be formed by coating and hardening the sealant on the portion of the middle-sized panel. In this case, the circuit lines between the thin film transistor Vcom line 112 and the color filter Vcom line 115 can be arranged in a sealed manner, without regard to the UV light transmittance. Accordingly the circuit lines can be compressed to make the width of all the circuit lines less than 0.6 mm, depending on a process.

In a process forming the liquid crystal display panel 100, the liquid crystal display panel 100 can be formed by cutting a boundary of cells in a mother panel. In other words, the liquid crystal display panel 100 can be formed by cutting the edge of the first and second substrates 110 and 120. In the present exemplary embodiment, the edge of the first and second substrates 110 and 120, or the edge of the black matrix BM, is the boundary of the cells, cut out to separate the liquid crystal display from the mother panel. In the present exemplary embodiment, the sealing member 130 is formed by being separated from the edge of the first and second substrates 110 and 120 so that the liquid crystal display panel 110 can be formed by cutting glass of the first and second substrates 110 and 120.

As described, circuit lines formed in the black matrix BM of the first substrate 110 are formed by arranging the circuit lines to be compressed to a side of the black matrix BM close to the active area A/A, so that the UV light blocking by the circuit lines is prevented during the sealant hardening process. Accordingly, the sealant is sufficiently hardened so that sufficient adhesiveness between the first and second substrates 110 and 120 is maintained.

Hereinafter, a liquid crystal display panel, according to another exemplary embodiment, will be described in further detail with reference to FIG. 3 to FIG. 7. In other exemplary embodiments, elements and features similar to the first exemplary embodiment are briefly described or a description thereof is omitted.

Figure 3:
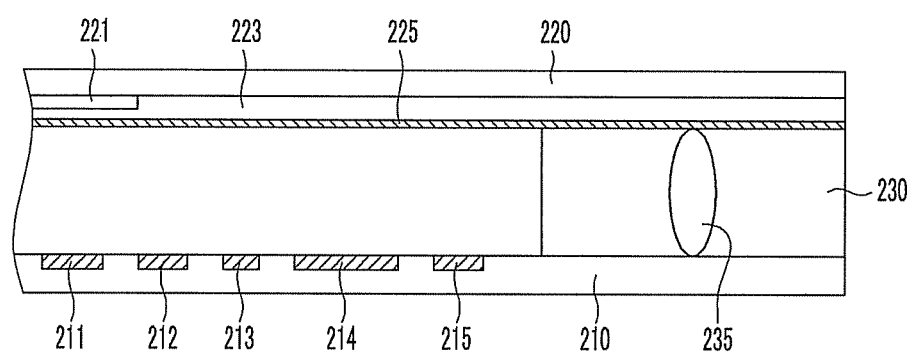
FIG. 3 is a partial cross-sectional view of a liquid crystal display panel 200 according to another exemplary embodiment.

FIG. 3 is a partial cross-sectional view of a liquid crystal display panel 200 according to another exemplary embodiment.

Referring to FIG. 3, the liquid crystal display panel 200, according to the present exemplary embodiment, includes a first substrate 210, a second substrate 220, and a sealing member 230 interposed therebetween. A thin film transistor (not shown) and a test pad line 211 are formed in an active area of the first substrate 210. A thin film transistor common voltage (Vcom) line 212, a buffer line 213, a gate driver 214, and a color filter common voltage (Vcom) line 215 are formed in a black matrix and are mounted on the first substrate 210. In addition, a color filter 221 is formed in the active area on the second substrate 220, an overcoat 223 is formed to cover the color filter 221, and a common electrode 225 is formed on the overcoat 223.

In the present exemplary embodiment, circuit lines, including the thin film transistor Vcom line 212, the buffer line 213, the gate driver 214, and the color filter Vcom line 215 are compressed to a side of the liquid crystal display panel 200 close to the active area of the black matrix. A sealing member 230 is formed along an edge of the black matrix.

Since the sealing member 230 is formed at the edge of the black matrix, a boundary of cells is cut by cutting an upper portion of the sealing member 230 of the liquid crystal display panel 200. In further detail, a sealant is coated on the boundary of cells of the second substrate 220 to seal the first and second substrates 210 and 220. The sealed first and second substrates 210 and 220 are hardened such that the sealing member 230 is formed to overlap neighboring cells on both sides. Then, a cutting groove is formed along an upper portion of the sealing member 230, and the liquid crystal display panel 200 is separated by hitting the cutting groove portion using a breaker. The sealing member 230 includes a spacer 235, and the first and second substrates 210 and 220 can maintain a constant gap using the spacer 235.

According to the present exemplary embodiment, the circuit lines formed by being mounted on the first substrate 210 do not block UV light during a sealant hardening process. Thus, the sealant can be sufficiently hardened and accordingly sufficient adhesiveness between the first and second substrates 210 and 220 can be maintained. In addition, a process to coat the sealant to each cell is replaced with a process to coat the sealant to the edge of the black matrix, that is, the boundary of neighboring cells, so that a manufacturing process of the liquid crystal display panel can be simplified.

Figure 4:
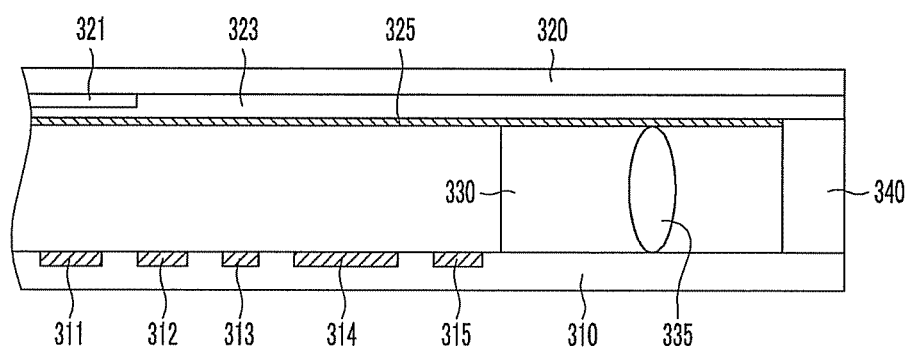
FIG. 4 is a partial enlarged cross-sectional view of a liquid crystal display panel 300 according to another exemplary embodiment.

FIG. 4 is a partial enlarged cross-sectional view of a liquid crystal display panel 300 according to another exemplary embodiment.

Referring to FIG. 4, a liquid crystal display panel 300 includes a first substrate 310, a second substrate 320, and a sealing member 330 interposed between the first and second substrates 320 and 330. A thin film transistor (not shown) and a test pad line 311 are formed in an active area of the first substrate 310. A thin film transistor Vcom line 312, a buffer line 313, a gate driver 314, and a color filter Vcom line 315 are formed in a black matrix area of the first substrate 310 and are mounted on the first substrate 310. In addition, a color filter 321 is formed in the active area on the second substrate 320, an overcoat 323 is formed to cover the color filter 321, and a common electrode 325 is formed on the overcoat 323.

In the present exemplary embodiment, circuit lines mounted on the first substrate 310, including the thin film transistor Vcom line 312, the buffer line 313, the gate driver 314, and the color filter Vcom line 315, are compressed to a side adjacent to an active area of the black matrix. The sealing member 330 and a dam 340 are formed in an external side of the active area of the black matrix.

In the present exemplary embodiment, the dam 340 is additionally formed at the external boundary of the sealing member 330. More particularly, the dam 340 is formed along an edge of the black matrix, and thus the boundary of cells can be cut by cutting an upper portion of the dam 340 in a manufacturing process of the liquid crystal display panel 300. The dam 340 is made of an organic or inorganic non-insulating material so that the boundary of cells can be cut by performing a process of cutting the upper portion of the dam 340 without performing a hitting process using a breaker. Accordingly, a defect rate in the liquid crystal display separation process can be reduced.

In addition, the dam 340 is formed first at a boundary between neighboring cells in the second substrate 320. Then, a sealant is coated to both sides of the neighboring cells so that sealing members formed at the neighboring cells can be formed to have a uniform width. In further detail, when the dam 340 is formed on the second substrate 320, the sealant is coated to both sides, and then the first substrates 310 is sealed to the second substrate 320, the sealant 340 having fluidity flows to the side according to pressure applied between the two substrates 310 and 320. The sealant that flows toward the boundary of the cells is blocked by the dam 340 and thus flows to a direction opposite of the boundary of the cells. After that, as the sealant is hardened, the sealing member 300 at both cells, with respect to the dam 340, is uniform in width. Accordingly, uniform and sufficient adhesiveness can be acquired between the first and second substrates 310 and 320 of the liquid crystal display panel 300. The sealing member 330 includes a spacer 335, and accordingly a gap between the first and second substrates 310 and 320 can be constantly maintained. However, aspects of the present invention are not limited thereto, and the spacer 335 may not be included in the sealing member 330.

Referring to FIG. 2 and FIG. 3, when no dam 340 is formed, the common electrode 125, 225 protrudes to the outside of the liquid crystal display panel 100, 200, and the common electrode 125, 225 contacts the mold frame of the backlight assembly when the mold frame and the liquid crystal display panel 100, 200 are sealed to form the liquid crystal display device. In general, the mold frame is formed with a metallic material, such as stainless steel, to protect parts of the backlight assembly, and thus a short-circuit may occur due to contact of the common electrode 125, 225 and the mold frame. However, when the dam 340 is formed at the outmost side of the common electrode 325 as shown in FIG. 4, the common electrode 325 does not protrude to the outside of the liquid crystal display panel 300. Thus, an occurrence of a short-circuit between the mold frame of the backlight assembly and the common electrode 325 can be suppressed.

The dam 340 is formed with a column spacer 335 that maintains the gap between the first and second substrates 310 and 320. The dam 340 is integrally formed with the overcoat 323 by extending the overcoat 323. However, aspects of the present invention are not limited thereto, and the column spacer 335 may not be formed and the dam 340 may not be integrally formed with the overcoat 323.

As described, according to the present exemplary embodiment, since the UV light is not blocked by the circuit lines formed in the first substrate 310 by being mounted thereon during the hardening process of the sealant, the sealant can be sufficiently hardened and accordingly the first and second substrates 310, 320 can maintain sufficient adhesiveness therebetween. In addition, the sealing member 330 is formed by forming the dam along the edge of the black matrix, that is, the boundary of the neighboring cell. Then the sealant is coated, without overlapping with the circuit lines formed in the black matrix of the first substrate, so that a defect rate during a manufacturing process of the liquid crystal display panel 300 can be reduced and uniform adhesiveness can be acquired. Furthermore, the dam 340 is formed so that occurrence of a short-circuit due to contact of the common electrode 325 and the mold frame of the backlight assembly can be suppressed.

Figure 5:
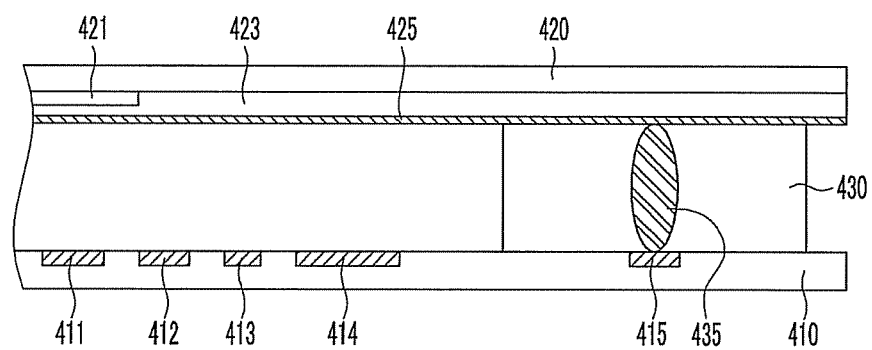
FIG. 5 is a partial enlarged cross-sectional view of a liquid crystal display panel 400 according to another exemplary embodiment.

FIG. 5 is a partial enlarged cross-sectional view of a liquid crystal display panel 400 according to another exemplary embodiment.

Referring to FIG. 5, the liquid crystal display panel 400 includes a first substrate 410, a second substrate 420, and a sealing member 430 interposed therebetween. A thin film transistor (not shown) and a test pad line 411 are formed in an active area of the first substrate 410. A thin film transistor Vcom line 412, a buffer line 413, a gate driver 414, and a color filter Vcom line 415 are formed in and mounted on a black matrix. In addition, a color filter 421 is formed in an active area on the second substrate 420, an overcoat 423 is formed to cover the color filter 421, and a common electrode 425 is formed on the overcoat 423.

In the present exemplary embodiment, circuit lines, including the thin film transistor Vcom line 412, the buffer line 413, and the gate driver 414, are compressed to a side adjacent to an active area of the black matrix. The color filter Vcom line 415 is separated from the circuit lines. In addition, a sealant is coated on an external side of the circuit lines, excluding the color filter Vcom line 415. Accordingly, the sealing member 430 is formed overlapping the color filter Vcom line 415. Although the color filter Vcom line 415 overlaps the sealant so that UV light is partially blocked in the sealing hardening process during the manufacturing method of the liquid crystal display panel 400, a width of the color filter Vcom line 415 is small enough, such that the UV light blocked by the color filter Vcom line 415 is negligible.

In the forming process of the sealing member 430, the sealing member 430 is formed by including a spacer 435 in the sealant and hardening the sealant. In further detail, the color filter Vcom line 415 and the common electrode 425 are can be connected by forming the spacer 435 with a conductive material or by forming the spacer 435 by coating a conductive material, such as a metal on a non-conductive material. As described, a gap between the first and second substrates 410 and 420 can be constantly maintained and a voltage can be applied to the second substrate 420 through the conductive spacer 435 by forming the sealing member 430 to be overlapped with the sealing member 430. Accordingly, an additional short spacer is not required so that the manufacturing process of the liquid crystal display panel can be simplified. In addition, since only the color filter Vcom line 415 is formed in the sealing member 430 to be separate from other circuit lines and the thin film transistor Vcom line 412, a short-circuit between the color filter Vcom line 415 and the thin film transistor Vcom line 412 can be prevented.

According to the present exemplary embodiment, the sealing member 430 is formed at an external boundary of the black matrix so that UV light blocking, due to circuit lines in the sealant hardening process, can be reduced and the first and second substrates 410 and 420 can maintain sufficient adhesiveness therebetween. In addition, the color filter Vcom line 415 is disposed at the external boundary of the black matrix so as to be overlapped with the sealing member 430. Also, the conductive spacer 435 is included in the sealing member 430 so that the process can be simplified, and accordingly, a yield of the manufacturing process can be improved.

Figure 6:
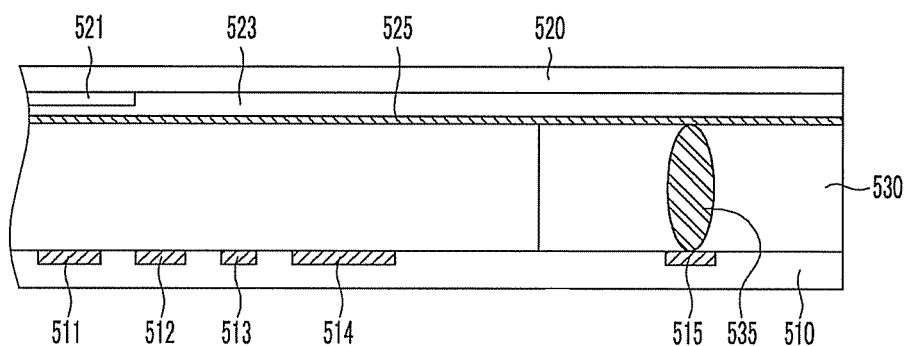
FIG. 6 is a partially enlarged cross-sectional view of a liquid crystal display panel 500 according to another exemplary embodiment.

FIG. 6 is a partially enlarged cross-sectional view of a liquid crystal display panel 500 according to another exemplary embodiment. Referring to FIG. 6, a liquid crystal display panel 500 includes a first substrate 510, a second substrate 520, and a sealing member 530 interposed therebetween. A thin film transistor (not shown) and a test pad line 511 are formed in an active area of the first substrate 510. A thin film transistor Vcom line 512, a buffer line 513, a gate driver 514, and a color filter Vcom line 515 are formed in and mounted on a black matrix on the first substrate 510. In addition, a color filter 521 is formed in the active area on the second substrate 520, an overcoat 523 is formed to cover the color filter 521, and a common electrode 525 is formed on the overcoat 523.

In the present exemplary embodiment, circuit lines, including the thin film transistor Vcom line 512, the buffer line 513, and the gate driver 514 are compressed to a side adjacent to an active area of the black matrix. The color filter Vcom line 515 is separated from the circuit lines. In addition, a sealant is coated to the external side of the circuit lines, excluding the color filter Vcom line 515. Accordingly, the sealing member 530 is formed to overlap the color filter Vcom line 515. As described above, although UV light is partially blocked by the color filter Vcom line 515 during the sealant hardening process, a width of the color filter Vcom line 515 occupying a lower portion of the sealant is small enough so that the UV light blocked by the color filter Vcom line 515 is negligible.

In the present exemplary embodiment, the sealing member 530 is disposed at an edge of the black matrix so that the cell boundary can be cut by cutting an upper portion of the sealing member 530 during the manufacturing process of the liquid crystal display panel 500. With such a structure, the manufacturing process of the liquid crystal display panel 500 can be simplified as in the previous exemplary embodiment shown in FIG. 3.

In addition, as in the exemplary embodiment shown in FIG. 5, the sealing member 530 is formed by including a conductive spacer 535 in the sealant and hardening the sealant. The color filter Vcom line 515 and the common electrode 525 are connected through the conductive spacer 535, and accordingly an additional short spacer is not required. Therefore, the manufacturing process of the liquid crystal display panel can be simplified. In addition, since only the color filter Vcom line 515 is formed to be overlapped with the sealing member 530, and is thus separated from the thin film Vcom line 512, a short-circuit between the color filter Vcom line 515 and the thin film transistor Vcom line 512 can be prevented.

According to the present exemplary embodiment, the sealing member 530 is formed at an external boundary of the black matrix so that UV light blocking, due to the circuit lines, during the sealant hardening process can be reduced. Accordingly, the first and second substrates 510 and 520 can maintain sufficient adhesiveness therebetween. In addition, the conductive spacer 535 is included in the sealing member 530 and the sealing member 530 is formed along the edge of the black matrix. The color filter Vcom line 515 is disposed to overlap with the sealing member 530. Accordingly, the manufacturing process of the liquid crystal display panel 500 can be simplified so that a yield in manufacturing the liquid crystal display panel 500 can be improved.

Figure 7:
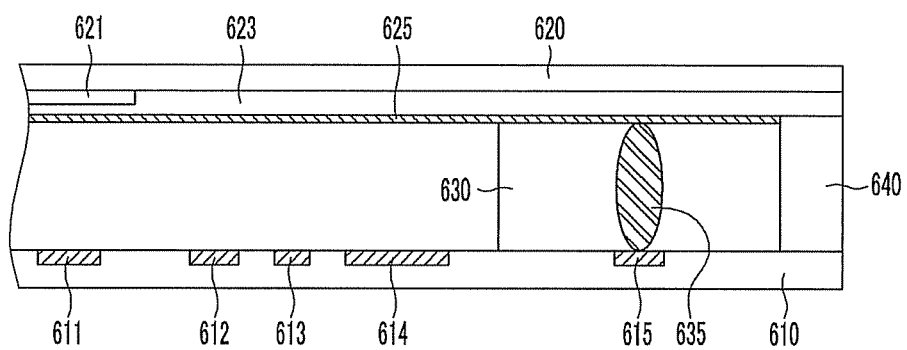
FIG. 7 is a partially enlarged cross-sectional view of a liquid crystal display panel 600 according to another exemplary embodiment.

FIG. 7 is a partially enlarged cross-sectional view of a liquid crystal display panel 600 according to another exemplary embodiment. Referring to FIG. 7, the liquid crystal display panel 600 includes a first substrate 610, a second substrate 620, and a sealing member 630 interposed therebetween. A thin film transistor (not shown) and a test pad line 611 are formed in an active area of the first substrate 610. A thin film transistor Vcom line 612, a buffer line 613, a gate driver 614, and a color filter Vcom line 615 are formed in and mounted on a black matrix. A color filter 621 is formed in the active area on the second substrate 620, an overcoat 623 is formed to cover the color filter 621, and a common electrode 625 is formed on the overcoat 623.

In the present exemplary embodiment, circuit lines, including the thin film transistor Vcom line 612, the buffer line 613, and the gate driver 614 are compressed to a side adjacent to an active area of the black matrix. The color filter Vcom line 615 is separated from the circuit lines. The sealing member 630 and a dam 640 are overlapped with the color filter Vcom line 615 and are formed along an edge of the black matrix.

The dam 640 is formed along the edge of the black matrix, and thus the cell boundary can be cut by cutting an upper portion of the dam 640 in the manufacturing process of the liquid crystal display panel 600. Accordingly, a defect rate during the cutting process of the liquid crystal display panel can be reduced. In addition, as described in the exemplary embodiment of FIG. 4, sealing members 330 formed at cells that neighbor, and that have the dam 640 as a boundary, can be formed with a uniform width so that uniform and sufficient adhesiveness can be acquired. Thus, occurrence of a short-circuit between the common electrode 625 and a mold frame of the backlight assembly (not shown) during assembling of the liquid crystal display device can be suppressed.

In addition, as in the exemplary embodiment of FIG. 5, the sealing member 630 is formed by including a conductive spacer 635 in the sealant and hardening the sealant. The color filter Vcom line 615 and the common electrode 625 are connected through the conductive spacer 635, and accordingly an additional short spacer is not required. Therefore, the manufacturing process of the liquid crystal display panel can be simplified. In addition, only the color filter Vcom line 615 is formed to be overlapped with the sealing member 630. Thus, the color filter Vcom line 615 is separated from the thin film Vcom line 612, and a short-circuit between the color filter Vcom line 615 and the thin film transistor Vcom line 612 can be prevented.

As described, according to the present exemplary embodiment, UV light blocking by the circuit lines mounted on the substrate 610 is reduced in the hardening process of the sealant so that the sealant can be sufficiently hardened. Accordingly, the first and second substrates 610 and 620 can maintain sufficient adhesiveness therebetween. In addition, the conductive spacer 635 is included in the sealing member 630 and the color filter Vcom line 615 so as to overlap with the sealing member 630. Accordingly, the manufacturing process of the liquid crystal display panel can be simplified so that the yield of manufacturing can be improved. In addition, the dam 640 is formed along an edge of the black matrix, that is, the boundary of neighboring cells. Thus, a defect rate in the manufacturing process of the liquid crystal display panel 600 can be reduced and uniform adhesiveness between the substrates can be acquired, and occurrence of a short-circuit can be suppressed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid crystal display panel comprising:
a first substrate comprising a major surface;
a second substrate facing the first substrate;
a common electrode formed over the second substrate;
a sealing member interposed between the first substrate and the second substrate;
a display area when viewed in a direction perpendicular to the major surface;
a non-display area surrounding the display area when viewed in the direction;
a pixel array formed over the first substrate and within the display area when viewed in the direction, the pixel array comprising pixel circuits; and
circuitry formed over the first substrate and within the non-display area when viewed in the direction, wherein the circuitry comprises a gate driver circuit configured to drive the pixel circuits;
wherein the sealing member is disposed in the non-display area when viewed in the direction,
wherein the gate driver circuit is located within the non-display area and between the display area and the sealing member when viewed in the direction,
wherein the circuitry further comprises a first common voltage line and a second common voltage line, wherein the first common voltage line is connected to the pixel circuits to provide a first reference voltage, wherein the second common voltage line is connected to the common electrode to provide a second reference voltage.

2. The liquid crystal display panel of claim 1, wherein the sealing member is separated from an edge of the first substrate and an edge of the second substrate.

3. The liquid crystal display panel of claim 1, wherein the sealing member is formed along an edge of one of the first substrate and the second substrate.

4. The liquid crystal display panel of claim 1, further comprising a dam formed along an edge of one of the first substrate and the second substrate.

5. The liquid crystal display panel of claim 4, wherein the common electrode is formed in an inner side of the liquid crystal display panel, taking the dam as a boundary thereof.

6. The liquid crystal display panel of claim 1, wherein the sealing member is disposed between an edge of the first substrate and the second common voltage line when viewed in the direction.

7. The liquid crystal display panel of claim 1, wherein the sealing member overlaps the second common voltage line when viewed from the direction.

8. The liquid crystal display panel of claim 7, wherein the sealing member comprises a spacer.

9. The liquid crystal display panel of claim 8, wherein the spacer connects the second common voltage line and the common electrode.

10. The liquid crystal display panel of claim 9, wherein the spacer is formed with a conductive material or formed by coating a metal on a non-conductive material.

11. The liquid crystal display panel of claim 1, wherein the gate driver circuit is located between the first and second common voltage lines when viewed in the direction.

12. The liquid crystal display panel of claim 1, wherein the circuit lines further comprise at least an additional conductive line located between the first and second common voltage lines when viewed in the direction.

13. A liquid crystal display panel comprising:
a first substrate having a pixel area, a transistor, a capacitor, and a pixel electrode, the first substrate comprising a major surface;
a second substrate facing the first substrate and having a common electrode disposed over the second substrate;
a sealing member interposed between the first substrate and the second substrate,
a display area when viewed in a direction perpendicular to the major surface;
a non-display area surrounding the display area when viewed in the direction;
circuitry formed over the first substrate and comprising a gate driver circuit configured to drive the transistor and circuit lines disposed over the first substrate and including a common voltage line; and
a conductive spacer electrically connecting the common voltage line and the common electrode,
wherein the gate driver circuit is located within the non-display area and between the display area and the sealing member when viewed in the direction.

14. The liquid crystal display panel of claim 13, wherein the circuit lines comprise a test pad line disposed between the common voltage line and the pixel area when viewed in the direction.

15. The liquid crystal display panel of claim 14, wherein the circuit lines further comprise another common voltage line disposed between the test pad line and the common voltage line when viewed in the direction.

16. The liquid crystal display panel of claim 15, wherein the circuit lines further comprise a buffer line and the gate driver circuit disposed between the common voltage line and the other common voltage line when viewed in the direction.

17. The liquid crystal display panel of claim 13, wherein the common voltage line is insulated by the sealing member.

18. The liquid crystal display panel of claim 17, wherein the conductive spacer is disposed inside the sealing member.

* * * * *